US012671587B2

(12) United States Patent
Jurss et al.

(10) Patent No.: US 12,671,587 B2
(45) Date of Patent: Jun. 30, 2026

(54) NON-CUSTODIAL CRYPTOCURRENCY WALLET

(71) Applicant: Visa International Service Association, San Francisco, CA (US)

(72) Inventors: Bryce Jurss, Leander, TX (US); Suresh Kalakrishnan, Cedar Park, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 19/123,144

(22) PCT Filed: Nov. 17, 2022

(86) PCT No.: PCT/US2022/079994
§ 371 (c)(1),
(2) Date: Apr. 22, 2025

(87) PCT Pub. No.: WO2024/107223
PCT Pub. Date: May 23, 2024

(65) Prior Publication Data
US 2026/0012348 A1     Jan. 8, 2026

(51) Int. Cl.
*H04L 9/32* (2006.01)
*G06Q 20/36* (2012.01)
(Continued)

(52) U.S. Cl.
CPC ........... *H04L 9/3213* (2013.01); *G06Q 20/36* (2013.01); *G06Q 20/3829* (2013.01); *H04L 9/0869* (2013.01)

(58) Field of Classification Search
CPC ..... H04L 9/3213; H04L 9/0869; G06Q 20/36; G06Q 20/3829
See application file for complete search history.

(56) References Cited

U.S. PATENT DOCUMENTS

| | | | |
|---|---|---|---|
| 10,412,075 B2 | 9/2019 | Matsugashita | |
| 11,063,925 B1 * | 7/2021 | Vera .................... | G06F 16/1824 |

(Continued)

FOREIGN PATENT DOCUMENTS

| | | |
|---|---|---|
| CN | 1507733 A | 6/2004 |
| CN | 110633778 A | 12/2019 |

(Continued)

OTHER PUBLICATIONS

International Search Report and Written Opinion for corresponding International Application No. PCT/US2022/079994 mailed Aug. 16, 2023.

(Continued)

*Primary Examiner* — Khoi V Le
(74) *Attorney, Agent, or Firm* — K&L Gates LLP

(57) ABSTRACT

The present disclosure describes a non-custodial cryptocurrency wallet application, software development kit, method, and system that blend the advantages of custodial and non-custodial schemes. The system leverages existing user credentials and networks of users to generate seed phrases and encryption keeps for the end-users. The non-custodial cryptocurrency wallet application simulates the user interface of a custodial crypto wallet with the advantages and security of a non-custodial crypto wallet.

18 Claims, 8 Drawing Sheets

(51) Int. Cl.
    *G06Q 20/38*       (2012.01)
    *H04L 9/08*        (2006.01)

(56)             References Cited

U.S. PATENT DOCUMENTS

| | | |
|---|---|---|
| 2003/0172278 A1 | 9/2003 | Farnham et al. |
| 2013/0219489 A1 | 8/2013 | Tribble |
| 2017/0006471 A1 | 1/2017 | Kim et al. |
| 2021/0014060 A1 | 1/2021 | Georgiadis et al. |
| 2022/0014358 A1 | 1/2022 | Retaureau et al. |
| 2022/0067703 A1* | 3/2022 | Sarin .................... G06Q 20/322 |
| 2022/0237595 A1* | 7/2022 | Roach .................. H04L 9/0822 |
| 2024/0127232 A1 | 4/2024 | Brown et al. |

FOREIGN PATENT DOCUMENTS

| | | |
|---|---|---|
| CN | 113515738 A | 10/2021 |
| CN | 114793455 A | 7/2022 |
| KR | 1020180056374 A | 5/2018 |
| WO | 2020092900 A2 | 5/2020 |
| WO | 2024107223 A1 | 5/2024 |

OTHER PUBLICATIONS

Supplementary European Search Report for corresponding European Application No. 22966000.6 mailed Jul. 21, 2025.
Dalskov et al: "2FE: Two-Factor Encryption for Cloud Storage", arxiv.org, Oct. 27, 2020.
Chinese Office Action and Search Report for corresponding Chinese Application No. 2022801013872 mailed on Jan. 10, 2026.

* cited by examiner

200

Crypto Platform
Server

204

Authentication
Server

208

Application
Server

212

210

Users

202

Blockchain Network 1
HD Wallet

206

400

500

NON-CUSTODIAL CRYPTOCURRENCY WALLET

CROSS-REFERENCE TO RELATED APPLICATIONS

This application is a U.S. National Stage Entry under 35 U.S.C. § 371 of International Patent Application No. PCT/US2022/079994, entitled NON-CUSTODIAL CRYPTO-CURRENCY WALLET, filed Nov. 17, 2022, the entire disclosure of which is hereby incorporated by reference herein.

TECHNICAL FIELD

The present disclosure allows cryptocurrency systems to leverage existing credentials with a financial institution to create a non-custodial access scheme for a cryptocurrency wallet. By leveraging an existing network of issuers, financial institutions and a cryptocurrency platform host can deliver a mainstream crypto wallet solution through trusted channels allowing developed and underdeveloped financial systems to engage in commerce seamlessly and globally.

SUMMARY

In one aspect, the present disclosure provides a method comprising: receiving, by a processor, a user credential and an account identifier from a user interface of a user device; transmitting, by the processor, the user credential to an authentication server; receiving, by the processor, a refresh token based on authentication of the user credential by the authentication server; generating, by the processor, a unique user identifier (UUID) based on the refresh token of the user credential; generating, by the processor, a seed phrase, wherein the seed phrase is randomly generated by a pseudorandom number generator, and wherein the seed phrase is at least n number of bits; determining, by the processor, a master private key, wherein the master private key is derived from the seed phrase, and wherein a first blockchain private key is associated with the master private key; converting, by the processor, the seed phrase to a string seed phrase based on a predetermined word list, a number of words in the string seed phrase is proportional to the at least n number of bits; encrypting, by the processor, the string seed phrase with the UUID, wherein the UUID is an encryption key to generate an encrypted string seed phrase from the string seed phrase; transmitting, by the processor, the encrypted string seed phrase and the account identifier to an external storage location, wherein the external storage location stores the encrypted string seed phrase and the account identifier associated with the user; and deleting, by the processor, the UUID from local cache.

In another aspect, the present disclosure provides a system comprising: account authentication server; crypto platform server; a user device comprising one or more processors, wherein the user device is communicably coupled to the account authentication server and the crypto platform server, and wherein the user device is configure to: receive a user credential and an account identifier from a user interface of user device; transmit the user credential to an authentication server; receive a refresh token based on authentication of the user credential by the authentication server; generate a unique user identifier (UUID) based on the refresh token of the user credential; generate a seed phrase, a seed phrase, wherein the seed phrase is randomly generated by a pseudorandom number generator, and wherein the seed phrase is at least 128 number of bits; determine a master private key, wherein the master private key is derived from the seed phrase, and wherein a first blockchain private key is associated with the master private key; convert the seed phrase to a string seed phrase based on a predetermined word list, wherein the string seed phrase is at least 12 words; encrypt the string seed phrase with the UUID, wherein the UUID is an encryption key to generate an encrypted string seed phrase from the string seed phrase; transmit the encrypted string seed phrase and the account identifier to an external storage location, wherein the external storage location stores the encrypted string seed phrase and the account identifier associated with the user; and delete the UUID from local cache.

In yet another aspect, the present disclosure provides a non-transitory computer readable medium, with instructions stored thereon, when executed by one or more processors, cause the one or more processors to perform operations comprising: receiving a user credential and an account identifier from a user interface of a user device; transmitting the user credential to an authentication server; receiving a refresh token based on authentication of the user credential by the authentication server; generating a unique user identifier (UUID) based on the refresh token of the user credential; generating, by the processor, a seed phrase, a seed phrase, wherein the seed phrase is randomly generated by a pseudorandom number generator, and wherein the seed phrase is at least n number of bits; determining a master private key, wherein the master private key is derived from the seed phrase, and wherein a first blockchain private key is associated with the master private key; converting the seed phrase to a string seed phrase based on a predetermined word list, a number of words in the string seed phrase is proportional to the at least n number of bits; encrypting the string seed phrase with the UUID, wherein the UUID is an encryption key to generate an encrypted string seed phrase from the string seed phrase; transmitting the encrypted string seed phrase and the account identifier to an external storage location, wherein the external storage location stores the encrypted string seed phrase and the account identifier associated with the user; and deleting, by the processor, the UUID from local cache.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
Figure 1:
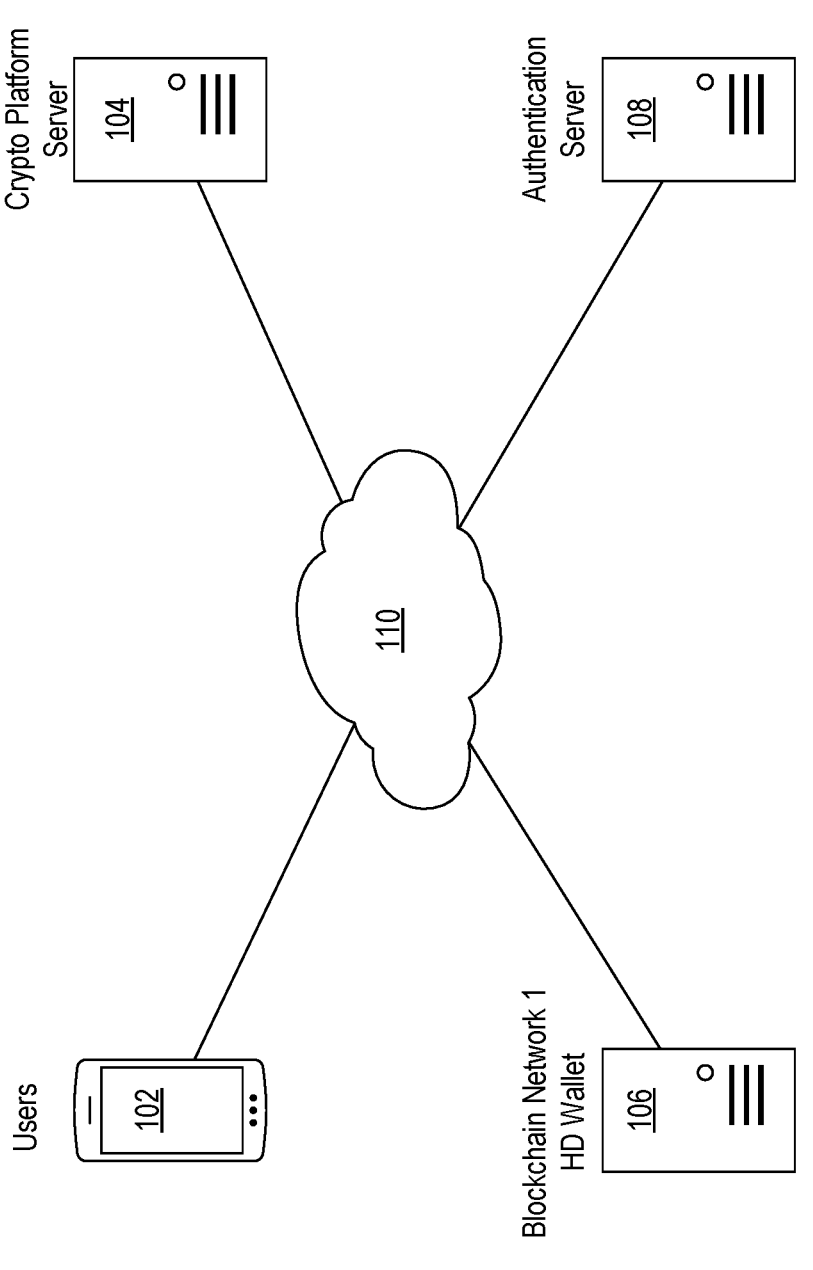

The non-custodial cryptocurrency wallet apparatuses, systems, and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates a system architecture for a user device that is configurable to run a crypto wallet application, according to at least one aspect of the present disclosure.

Figure 2:

FIG. 2 illustrates a system architecture for a user device that is configurable to run a crypto wallet application on a web browser, hosted by an application server, according to at least one aspect of the present disclosure.

Figure 3:
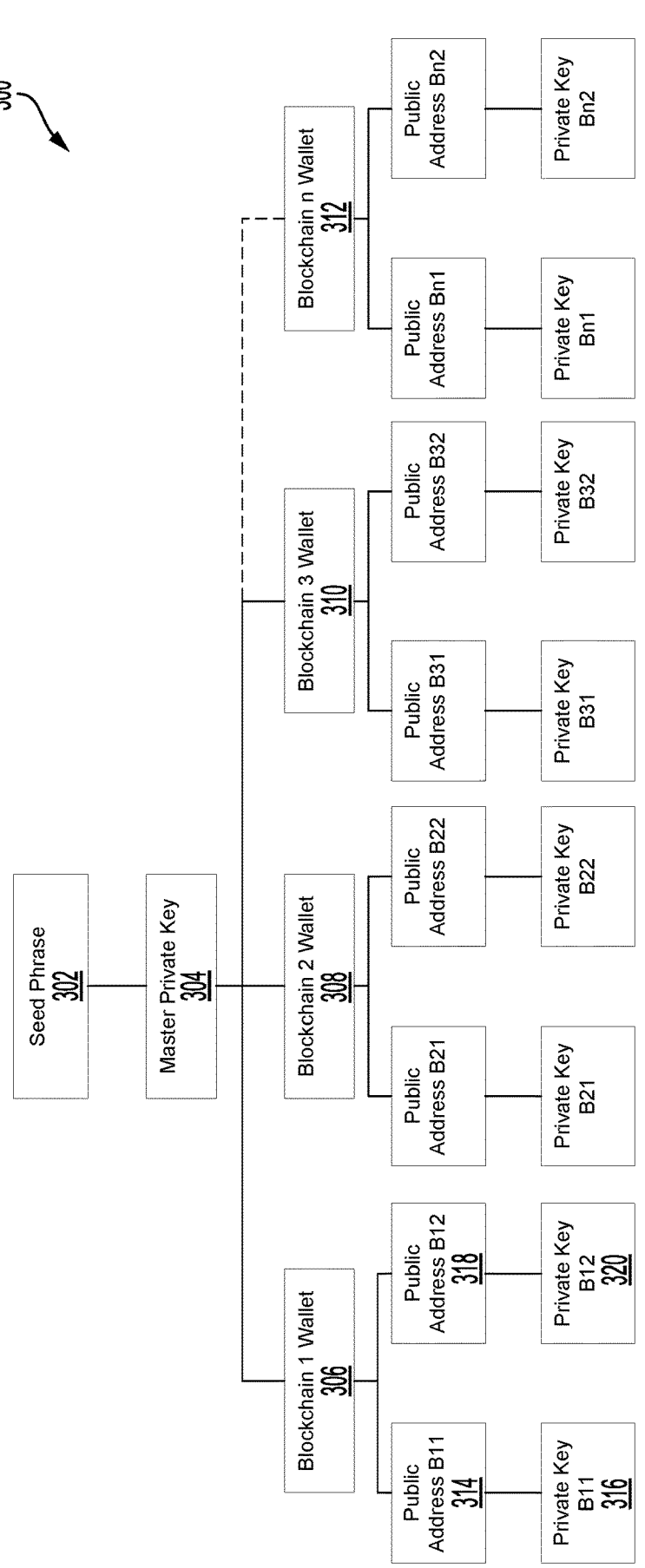

FIG. 3 illustrates a hierarchical deterministic (HD) wallet supported by most major blockchain networks (e.g., Bitcoin, Ethereum, etc.), according to at least one aspect of the present disclosure.

Figure 4:
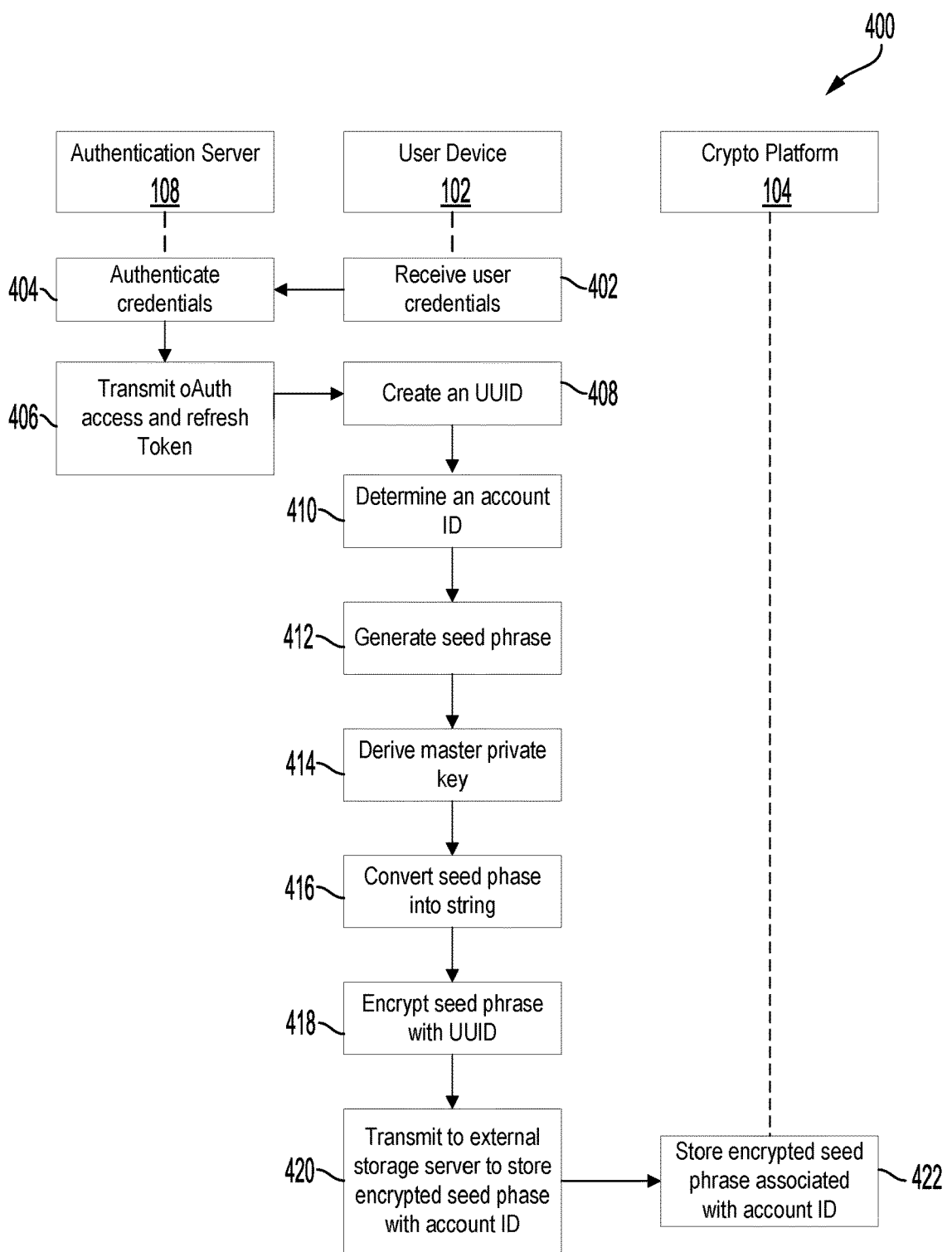

FIG. 4 is a logic flow diagram for generating a seed phrase and encryption key for a crypto wallet, according to at least one aspect of the present disclosure.

Figure 5:
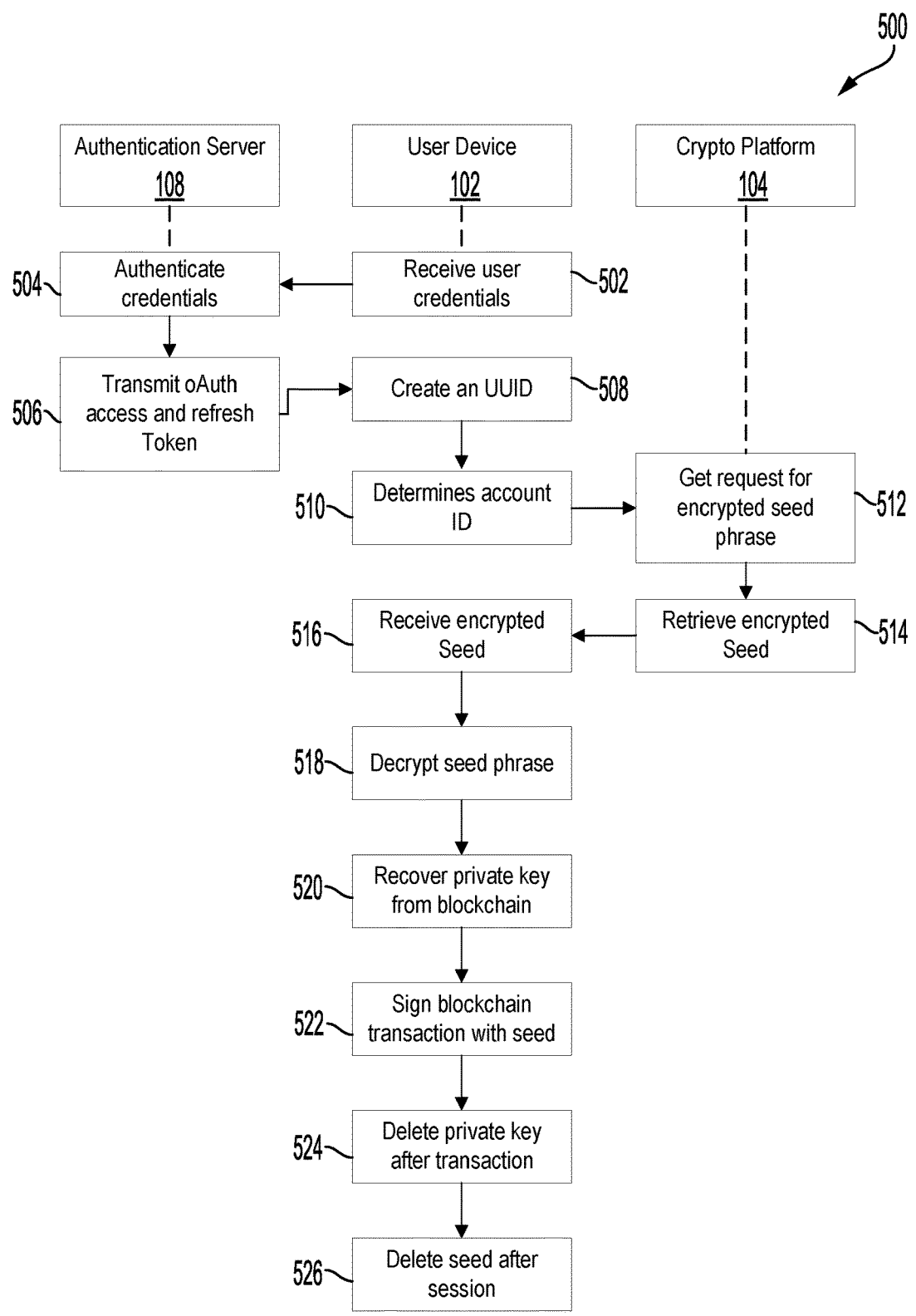

FIG. 5 is a logic flow diagram for recovering an encrypted seed phrase from an external storage server and performing a blockchain transaction, according to at least one aspect of the present disclosure.

Figure 6:
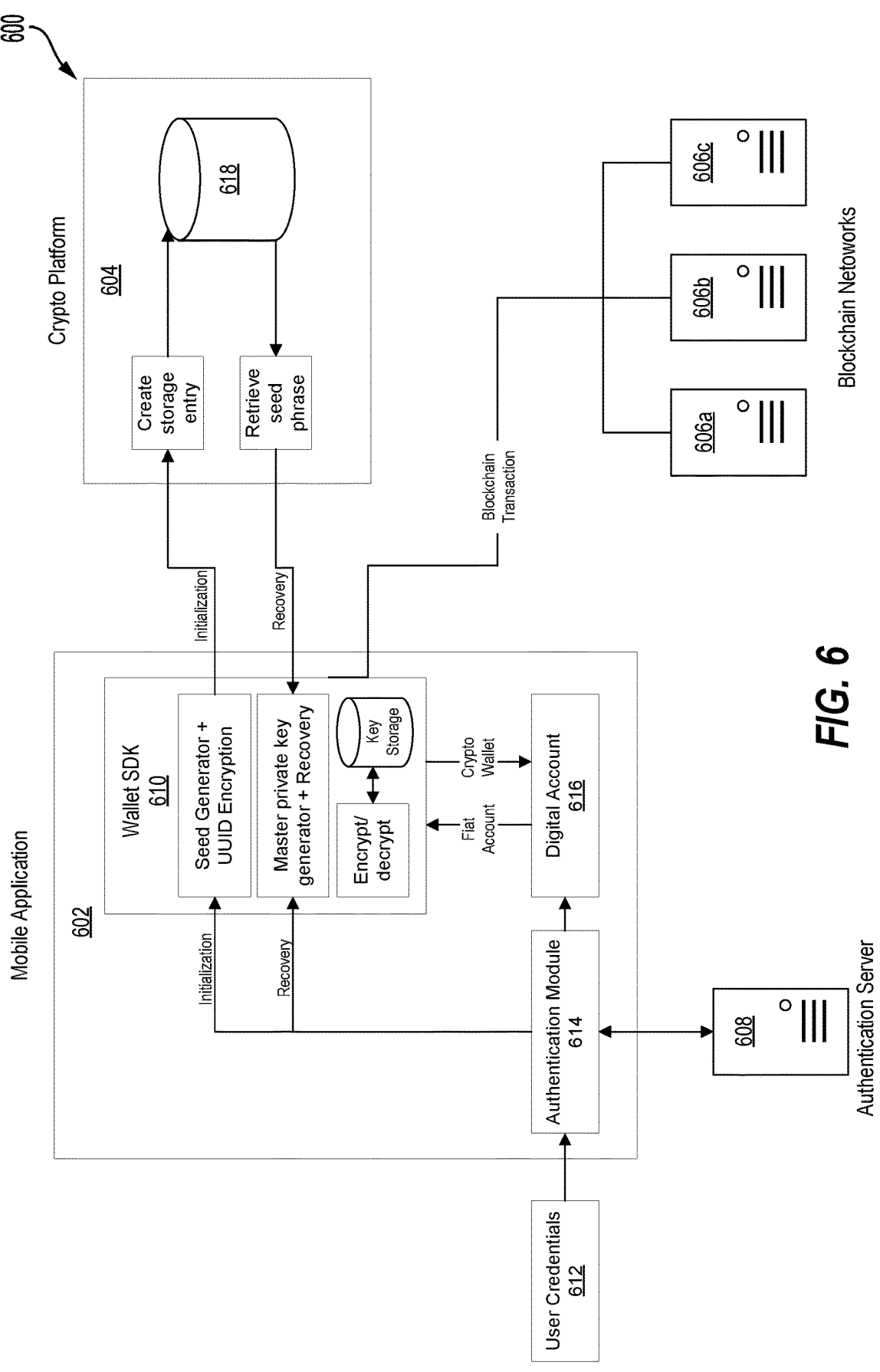

FIG. 6 illustrates a diagram of a system for initializing and recovering an encrypted seed phrase, according to at least one aspect of the present disclosure.

Figure 7:
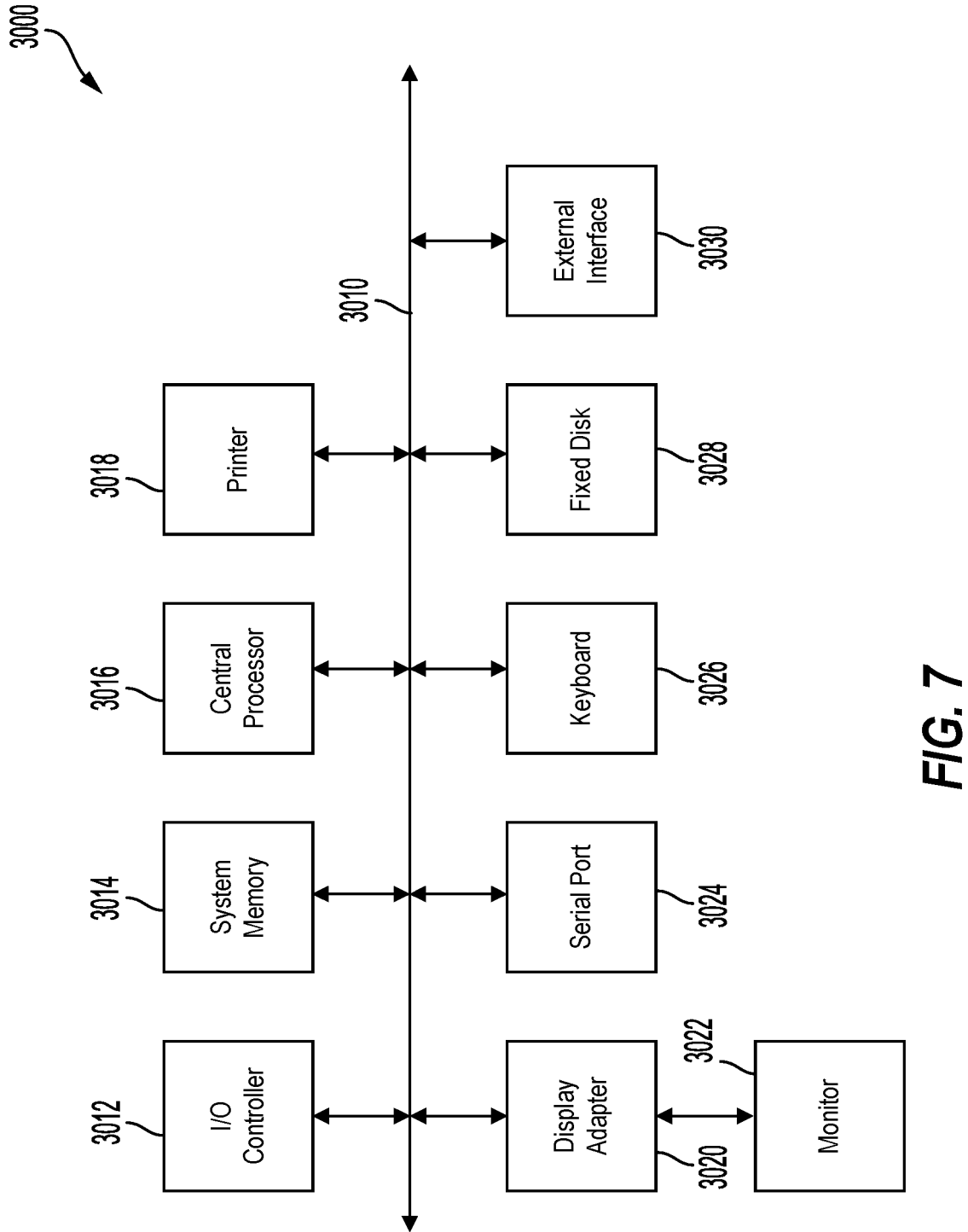

FIG. 7 is a block diagram of a computer apparatus with data processing subsystems or components, according to at least one aspect of the present disclosure.

Figure 8:
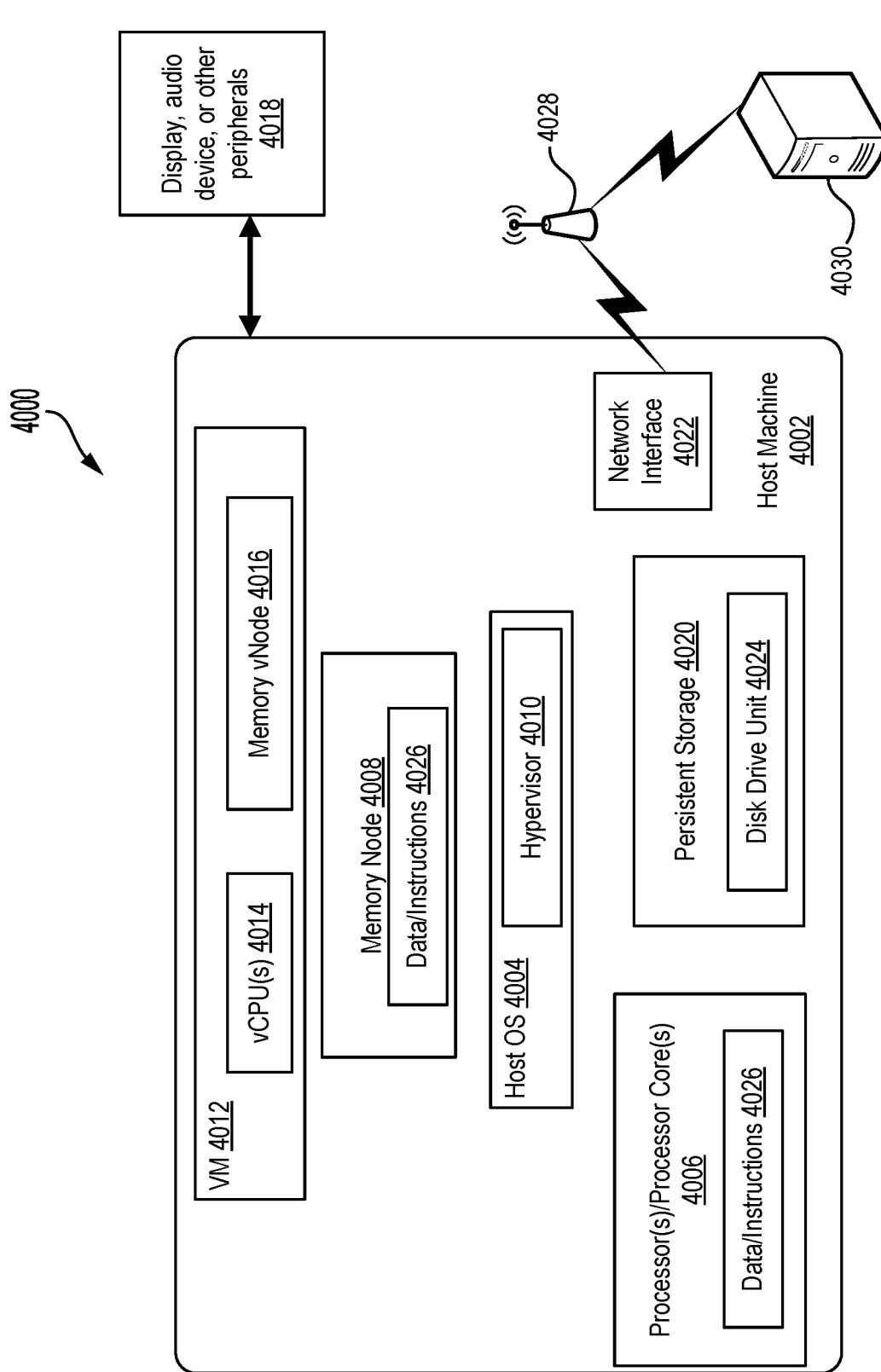

FIG. 8 is a diagrammatic representation of an example system that includes a host machine within which a set of instructions to perform any one or more of the methodologies discussed herein may be executed, according to at least one aspect of the present disclosure.

DESCRIPTION

The following disclosure may provide exemplary systems, devices, and methods for conducting a financial transaction and related activities. Although reference may be made to such financial transactions in the examples provided below, aspects are not so limited. That is, the systems, methods, and apparatuses may be utilized for any suitable purpose.

Before discussing specific embodiments, aspects, or examples, some descriptions of terms used herein are provided below.

"Account credentials" may include any information that identifies an account and allows a payment processor to verify that a device, person, or entity has permission to access the account. For example, account credentials may include an account identifier (e.g., a PAN), a token (e.g., account identifier substitute), an expiration date, a cryptogram, a verification value (e.g., card verification value (CVV)), personal information associated with an account (e.g., address, etc.), an account alias, or any combination thereof. Account credentials may be static or dynamic such that they change over time. Further, in some embodiments or aspects, the account credentials may include information that is both static and dynamic. For example, an account identifier and expiration date may be static but a cryptogram may be dynamic and change for each transaction. Further, in some embodiments or aspects, some or all of the account credentials may be stored in a secure memory of a user device. The secure memory of the user device may be configured such that the data stored in the secure memory may not be directly accessible by outside applications and a payment application associated with the secure memory may be accessed to obtain the credentials stored on the secure memory. Accordingly, a mobile application may interface with a payment application in order to gain access to payment credentials stored on the secure memory.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A "wallet application" may include a software module with similar functionality to a payment application that has multiple accounts provisioned or enrolled such that they are usable through the wallet application. Further, an "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

"Authentication" is a process by which the credential of an endpoint (including but not limited to applications, people, devices, process, and systems) can be verified to ensure that the endpoint is who they are declared to be.

The terms "client device" and "user device" refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

A "credential" may be any suitable information that serves as reliable evidence of worth, ownership, identity, or authority. A credential may be a string of numbers, letters, or any other suitable characters that may be present or contained in any object or document that can serve as confirmation. Examples of credentials include value credentials, identification cards, certified documents, access cards, passcodes and other login information, etc.

A "cryptographic algorithm" can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. Encryption techniques may include symmetric and asymmetric encryption techniques.

Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

An "end-user" may include any application, consumer, process, or system that is configured to interact with a requestor for tokenization/de-tokenization/token management services. For example, an end-user may include a consumer, a merchant, a mobile device, or any other suitable entity that may be associated with a requestor in the network token system.

An "interface" may include any software module configured to process communications. For example, an interface may be configured to receive, process, and respond to a particular entity in a particular communication format. Further, a computer, device, and/or system may include any number of interfaces depending on the functionality and capabilities of the computer, device, and/or system. In some embodiments or aspects, an interface may include an application programming interface (API) or other communication format or protocol that may be provided to third parties or to a particular entity to allow for communication with a device. Additionally, an interface may be designed based on functionality, a designated entity configured to communicate with, or any other variable. For example, an interface may be configured to allow for a system to field a particular request or may be configured to allow a particular entity to communicate with the system.

As used herein, the term "merchant" may refer to one or more individuals or entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein "merchant system" may refer to one or more computer systems operated by or on behalf of a merchant, such as a server computer executing one or more software applications.

As used herein, a "mobile device" may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—e.g., using the other device as a modem—both devices taken together may be considered a single mobile device). A mobile device may also comprise a verification token in the form of, for instance, a secured hardware or software component within the mobile device and/or one or more external components that may be coupled to the mobile device. A detailed description of an exemplary mobile device is provided below.

"Provisioning" may include a process of providing data for use. For example, provisioning may include providing, delivering, or enabling a token on a device. Provisioning may be completed by any entity within or external to the transaction processing system. For example, in some embodiments or aspects, tokens may be provisioned by an issuer or a payment processing network onto a mobile device of a consumer (e.g. account holder). The provisioned tokens may have corresponding token data stored and maintained in the token vault or token registry. In some embodiments or aspects, a token vault or token registry may generate a token that may then be provisioned or delivered to a device. In some embodiments or aspects, an issuer may specify a token range from which token generation and provisioning can occur. Further, in some embodiments or aspects, an issuer may generate and notify a token vault of a token value and provide the token record information (e.g., token attributes) for storage in the token vault.

As used herein, the term "server" may include one or more computing devices which can be individual, standalone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments or aspects, the server computer may provide and/or support payment network cloud service.

As used herein, the term "system" may refer to one or more computing devices or combinations of computing devices (e.g., processors, servers, client devices, software applications, components of such, and/or the like).

Alternatively, dynamic tokens can include tokens that are limited or restricted in use (e.g., limited by time, amount threshold (aggregated amount or single-transaction amount), or by number of uses). As such, dynamic tokens can be generated and delivered on a per-transaction or on an as needed basis to the end-user to initiate a payment transaction through a registered and authenticated device and/or channel. For example, a one-time use dynamic token can be used at electronic-commerce (e-commerce) websites and if the dynamic token is intercepted by a third party, the dynamic token may be useless because it has been used and is thus worthless for future transactions.

Non-payment tokens may include tokens which are not substitutes for real account identifiers (e.g., PANs). For example, non-payment tokens may be used by merchant/acquirer systems for analytics, offers, customer support, marketing, etc. However, non-payment tokens may not be used to generate original and subsequent transactions using real account identifiers (e.g., PANs) or other account identifiers. Accordingly, non-payment tokens may include low value tokens that may be used for non-payment transactions or transaction services by an entity within the transaction processing system.

The token presentment mode may include any identifier or method for indicating the mode through which a token is provided. For example, the token presentment mode may include a number associated with a particular type of transaction (e.g., 5 for NFC transaction, 3 for QR Code, etc.). Further, in some embodiments or aspects, the token presentment mode could be provided through a type of cryptogram or other dynamic data generated for a transaction. For example, each type of transaction presentment mode may have a different cryptogram algorithm associated with that type of presentment mode (e.g., NFC vs. QR Code), and the type of cryptogram used by be determined during validation of the cryptogram. Additionally, a token presentment mode may be provided by a mobile device or may be populated by a merchant access device (e.g., a POS terminal) or other entity within the transaction processing system (e.g., acquirer computer, merchant processor, etc.).

"Token Processing" may refer to transaction processing in which a token is present in lieu of the primary account number (PAN). The token is processed from the point of interaction throughout the network. The token processing further includes using the token vault for de-tokenization of the token in order to complete the transaction. Token processing may span payment processes that include authorization, capture, clearing, and exception processing.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments or aspects, a token request message may be formatted as an authorization request message (e.g., an ISO 8583 message format). In some embodiments or aspects, the token request message may have a zero dollar amount in an authorization amount field. As another example, the token request message may include a flag or other indicator specifying that the message is a token request message.

A "token request indicator" may refer to an indicator used to indicate that the message containing the indicator is related to a token request. The token request indicator may optionally be passed to the issuer as part of the Identification and Verification (ID&V) method to inform the issuer of the reason the account status check is being performed.

A "token requestor identifier (ID)" may include any characters, numerals, or other identifiers associated with an entity associated with a network token system. For example, a token requestor identifier may be associated with an entity that is registered with the network token system. In some embodiments or aspects, a unique token requestor ID may be assigned for each domain for a token request associated with the same token requestor. As such, in some embodiments or aspects, if a token requestor may request tokens for multiple domains, the token requestor may have multiple token requestor identifiers, one for each domain. For example, a token requestor ID can identify a pairing of a token requestor (e.g., a mobile device, a mobile wallet provider, etc.) with a token domain (e.g., e-commerce, contactless, etc.). A token requestor ID may include any format or type of information. For example, in one embodiment or aspect, the token requestor ID may include an alphanumerical value such as a ten digit or an eleven digit letter and/or number (e.g., 4678012345). In some embodiments or aspects, a token requestor ID may include a code for a token service provider (e.g., first 3 digits) such as the network token system and the remaining digits may be assigned by the token service provider for each requesting entity (e.g., mobile wallet provider) and the token domain (e.g., contactless, e-commerce, etc.).

In some embodiments or aspects, a token requestor identifier may be used in a transaction during authorization processing. For example, a token requestor identifier may be passed through a transaction request message to validate that the entity that is initiating the transaction is the same as the entity that requested and manages the token. In some embodiments or aspects, an entity (e.g., digital or mobile wallet provider, merchant, merchant of record, payment enabler, etc.) can be assigned a token requestor identifier during an on-boarding or registration process. In some embodiments or aspects, an acquirer/acquirer processor/payment enabler (e.g., payment service provider) may populate the token requestor identifier for each merchant, mobile wallet provider, consumer, etc. into the authorization message field prior to submitting the authorization request message to a payment processing network.

A "user" may include an individual. In some embodiments or aspects, a user may be associated with one or more personal accounts and/or mobile devices. The user may also be referred to as a cardholder, account holder, or consumer.

A "user device" is an electronic device that may be transported and/or operated by a user. A user device may provide remote communication capabilities to a network. The user device may be configured to transmit and receive data or communications to and from other devices. In some embodiments or aspects, the user device may be portable. Examples of user devices may include mobile phones (e.g., smart phones, cellular phones, etc.), PDAs, portable media players, wearable electronic devices (e.g. smart watches, fitness bands, ankle bracelets, rings, earrings, etc.), electronic reader devices, and portable computing devices (e.g., laptops, netbooks, ultrabooks, etc.). Examples of user devices may also include automobiles with remote communication capabilities.

The present disclosure describes an improved cryptocurrency wallet architecture that resolves the tension between custodial/non-custodial user interfaces and simplicity for regulatory and government compliance. In a custodial crypto wallet, the crypto platform host is responsible for the user's seed phrase, whereas in a non-custodial crypto wallet, the user is responsible for their own seed phrase.

In a custodial scheme, the end-user may log into their crypto wallet using end-user credentials and a two-factor authentication code, and use their crypto wallet to engage in blockchain transactions. The end-user may be unaware that the crypto platform host has a custodial responsibility to store and retrieve their seed phrase, or even be unaware that they have a seed phrase. The seed phrase is generated by the crypto platform host and the end-user is not concerned about remembering this information. The seed phrase is a master key used to recover respective private keys for different blockchain networks. The end-user, in a custodial wallet, does not need to remember the multi-word (e.g., 12 to 24 words) seed phrase and is able to log into their crypto wallet even if they lose or forget their account password. Accordingly, in contrast to a non-custodial wallet, in a custodial scheme, the end-user can thus reset or retrieve lost or forgotten passwords.

Notwithstanding the above stated advantages of a custodial wallet scheme, there can be downsides. For example, if the end-user's credentials are compromised by a malicious actor, the malicious actor will have access to the seed phrase and all blockchain assets associated with the seed phrase. The crypto platform host also is constrained to additional government regulations due to their custodial responsibility to blockchain assets. In this regard, the crypto platform host must comply with blockchain and cryptocurrency transaction government regulations. Specifically, a financial institution in a custodial relationship may be required to account for the crypto assets of their end-users on their balance sheet. Unlike fiat currency, most financial institutions do not want to the burden of responsibility for volatile crypto assets (e.g., cryptocurrency or non-fungible tokens) and the complex valuation issues that accompany these assets.

In contrast, in a non-custodial scheme, the end-user is responsible for keeping their seed phrase. Many end-users prefer this scheme because it provides an additional layer of security and anonymity for blockchain transactions. In a non-custodial scheme, the end-user is not concerned about an account hack that can result in the liquidation of their blockchain assets. Additionally, financial institutions do not have direct access to the end-user's crypto assets and therefore are not responsible for reporting these assets on their balance sheet. Non-custodial accounts, however, are not immune from downsides. For example, many end-users of non-custodial accounts have lost their seed phrases and have no means of recovering or retrieving their blockchain assets. To avoid this issue, many end-users keep physical copies of their seed phrases, making the seed phrase vulnerable to physical theft. Even in the best circumstances, the end-user must enter a multi-word phrase (e.g., 12, 24 words or larger) using a cumbersome process for each block chain transaction through their crypto wallet.

The present disclosure describes a non-custodial cryptocurrency wallet that leverages the advantages of both the custodial and non-custodial schemes described above while minimizing or eliminating their shortcomings. In one aspect, a non-custodial crypto wallet may be deployed by a crypto platform host as an on-behalf-of (OBO) software development kit (SDK), white label mobile application, or web solution for a web browser, or combinations thereof. In other aspects, the crypto wallet may be configurable by financial institutions to leverage their existing account resources for new crypto services. By using existing account resources of the financial institutions, the end-user is provided an improved user experience in a non-custodial platform that simulates a custodial experience. Additionally, the crypto platform host may assist the financial institutions in managing the seed phases of their end-users. The SDK and white label applications allow the crypto platform host to circumvent red tape and regulatory hurdles associated with a custodial scheme, reduce integration time for financial institutions, simplify crypto go-to market (GTM) solutions for the crypto platform host, and enable foundational technical capabilities for new funds flows, value-added services, and additional crypto solutions.

In various aspects, the crypto wallet application may run locally on a user device like a smart phone or may be deployable through an application server to run on a web browser. The crypto wallet application is configurable to generate and/or retrieve an encryption key for an end-user seed phrase. Additionally, the crypto wallet application may establish a storage profile (e.g., vProfileID) for a new storage entry at an external storage server to store an encrypted seed phrase. The storage profile may link an end-user to their storage entry with financial intuition credentials and/or account identifier (e.g., phone number or email). The owner of the storage server, typically the crypto platform host, does not have access to the encryption key and therefore cannot decrypt the seed phrase in the storage entry. This relationship is critical to prevent the owner of the storage server from having custodial responsibility over the seed phrase and crypto assets. The external storage server is analogous to a bank holding customer property in a locked safety deposit box. For example, the bank never has control over the property as long as the customer has the key to the safety deposit box.

FIG. 1 illustrates a system architecture for a user device 102 that is configurable to run a crypto wallet application, according to at least one aspect of the present disclosure. The user device 102 is in communication with a crypto platform host server 104, authentication server 108 of a financial institution, and one or more blockchain networks 106, over a wide area network (WAN) 110. The crypto platform host server 104 may assist financial institutions in managing end-user seed phases. The end-users may login into their crypto wallet application with their banking credentials from their financial institution. The authentication server 108 may authenticate the banking credentials and provide a multi-factor authentication (MFA) code to the user device 102. A private key may be encrypted and stored locally on the user device 102, or web browser 202 (FIG. 2). As previously discussed, the authentication server 108 of the financial institutions and crypto platform host server 104 do not have access to the encryption key or unencrypted private key used for digitally signing transactions. In one aspect, the private key may be encrypted with a biometric token provided by the user device's 102 secure enclave. The financial institutions will ensure that the end-user's login is associated with a "know your customer" (KYC) account at their institution. The crypto platform host server 104 and a risk assessment service provider (e.g., TRM Labs) will provide the financial institutions with on-chain analytics to access risk of KYC end-user's activities on related blockchains. If an end-user engages in activities that trigger anti-money laundering (AML) flags, the end-user's fiat balances can be frozen and the KYC details with associated non-custodial wallet addresses and seed phrases can be provided to the appropriate financial crime authorities. An end-user can link their fiat accounts from a financial institution and/or a crypto platform credential to their non-custodial wallet to fund crypto related purchases. The crypto platform host server 104 may provide connection to crypto/decentralized finance (DeFi) services through native protocols (Blocknative) but neither the crypto platform host server 104 nor authentication server 108 of the financial institutions will be involved in the movement/exchange of crypto assets. The crypto platform host server 104 and the authentication server 108 of the financial institutions will be involved in business-as-usual fiat funds flow between exchanges and merchants who will directly deliver crypto assets or digital products to the end-user's non-custodial wallet via the related blockchain.

FIG. 2 illustrates a system architecture for a user device 202 that is configurable to run a crypto wallet application on a web browser, hosted by an application server 212, according to at least one aspect of the present disclosure. The user device 202 is in communication with a crypto platform host server 204, authentication server 208 of a financial institution and one or more blockchain networks 206, over a WAN 210.

FIG. 3 illustrates a hierarchical deterministic (HD) wallet 300 supported by most major blockchain networks (e.g., Bitcoin, Ethereum, etc.), according to at least one aspect of the present disclosure. In one example, the HD wallet 300 may be used to recover the private keys associated with each blockchain network 306-312, with the seed phrase 302. The HD wallet 300 is a crypto wallet that stores the private keys and associated public addresses for different blockchain networks, rather than crypto assets. A seed phrase 302 and/or master private key 304 is used to log into the HD wallet 300 and may be used to retrieve a private key associated with a specific blockchain network 306-312. The master private key 304 is mathematically equivalent to the seed phrase 302. In various aspects, the master private key is a binary, binary-coded decimal, or hexadecimal equivalent to the plurality of words that comprise the seed phrase 302. The HD wallet 300 may comprise information associated with several different blockchain networks 306-312 associated with the seed phrase 302. In one example, a first blockchain wallet 304 comprises a public address 314 associated with a private key 316 and a public address 318 associated with a private key 320.

FIG. 4 is a logic flow diagram 400 for generating a seed phrase and encryption key for a crypto wallet, according to at least one aspect of the present disclosure. With reference now to FIG. 4 together with FIG. 1, in one aspect, the user device 102 receives 402 user credentials through a user interface of the crypto wallet application. The user credentials are associated with the end-user's financial institution. The user device 102 transmits 404 the user credentials to the authentication server 108 of the financial institution. Upon authentication of the user credentials, the authentication server 108 transmits 406 an oAuth access token and refresh token to the user device 102. The user device 102 creates 408 a unique user identifier (UUID) that is used an encryption key. The user device 102 determines 410 an account identifier associated with the end-user or the user device 102 (e.g., email address or phone number). The user device 102 generates 412 a seed phrase for the user. In one example, the seed phrase is generated with a pseudorandom number generator for a predetermined number of bits. In various aspects, the seed phrase is at least 128 bits. The user device 102 derives 414 a master private key associated with the seed phrase. The user device 102 converts 416 the seed phrase into a string of syntax specific words according to a predefined word list. In one example, the wordlist may be determined according to Bitcoin improvement proposal (BIP) 32 or BIP39 wordlists. The user device 102 encrypts 418 the string seed phrase with the UUID. In one example, the UUID encryption key is the oAuth refresh token that is received upon authentication of the user credentials. The oAuth refresh token may be retrieved whether the end-user accesses the crypto wallet through an application on the user device 102 or through a web browser. The oAuth refresh token is repurposed from its original function, to refresh an access token after when the access token expires, to a UUID encryption key. In another example, the user device 102 generates the UUID encryption key based on the refresh token. In either example, the UUID is never available outside of the user device. The user device 102 transmits 420 the encrypted string seed phrase to the external storage location of the crypto platform host server 104, with the account identifier. The crypto platform host server 104 creates 422 a storage entry based on the account identifier.

FIG. 5 is a logic flow diagram 500 for recovering an encrypted seed phrase from an external storage server and performing a blockchain transaction, according to at least one aspect of the present disclosure. With reference now to FIG. 5 together with FIG. 1, in one aspect, the user device 102 receives 502 user credentials through a user interface of the crypto wallet application. The user credentials are associated with the end-user's financial institution. The user device 102 transmits 504 the user credentials to the authentication server 108 of the financial institution. Upon authentication of the user credentials, the authentication server 108 transmits 506 an oAuth access token and refresh token to the user device 102. The user device 102 creates 508 a unique user identifier that is used for an encryption key. The user device 102 determines 510 an account identifier associated with end-user or the user device 102 (e.g., email address or phone number) and transmits the account identifier in a get request. In various aspects, the get request is an API call to the crypto platform host server 104, to recover the encrypted string seed phrase. In various aspects, the API is authenticated through business-as-usual access to the crypt platform host API (e.g. Visa API). The crypto platform host server 104 receives 512 the get request and retrieves 514 the encrypted seed phrase associated with the account identifier. The user device 102 receives 516 the encrypted string seed phrase from the crypto platform host server 104. The user device 102 decrypts 518 the encrypted string seed phrase with the UUID (e.g., oAuth refresh token or biometric token). The UUID may be used as the same encryption key to encrypt and decrypt the string seed phrase. The user device 102 recovers 520 a first blockchain private key associated with a first blockchain network through an HD wallet.

The user device 102 uses the first blockchain private key to sign 522 a transaction associated with the first blockchain. The first blockchain private key is not stored in local cache or local storage of the user device 102 and a new private key is recovered from the HD wallet for a subsequent transaction. However, as long as the session is still active, the seed phrase is retained in local storage of the user device 102, to recover a new blockchain private key. The seed phrase is stored in an encrypted format and must be decrypted for each transaction in a session. Once the session is terminated, the encrypted seed phrase is deleted from the local storage on the user device 102. In various aspects, a session may be terminated when the end-user closes an application, displays a lock screen on the user device, or the session times out (e.g., a predetermined amount of time passes since the user device 102 receives a user input or a transaction is performed). The user device 102 deletes 524 the first blockchain private key from local storage after the transaction is signed and the user device 102 deletes 526 the seed phrase from local storage after the session is terminated.

FIG. 6 illustrates a diagram of a system 600 for initializing and recovering an encrypted seed phrase, according to at least one aspect of the present disclosure. In both the initialization and recovery loop, a mobile application 602 receives user credentials 612 and transmits them through an authentication module 614 to an authentication server 608. The mobile application 602 receives an access token from the authentication server 608 that allows the mobile application 602 to access a digital account 616 associated with the end-user's financial institution. The end-user is able to transfer fiat currency from their financial intuition digital account 616 to make a blockchain transaction on the wallet SDK 610. Similarly, the user may transfer fiat currency from the wallet SDK 610 to their digital account 616.

In the initialization loop, the wallet SDK 610 generates the seed phrase and determines a UUID encryption key. The seed phrase is encrypted and stored at a storage location 618 of the crypto platform host server 604.

In the recovery loop, the wallet SDK 610 makes an API call to the crypto platform host server 604 to retrieve the encrypted seed phrase. Once the wallet SDK 610 receives the encrypted seed phrase, it decrypts the seed phrase and recovers a blockchain private key from a respective blockchain network 606*a-c*. The wallet SDK 610 may then perform a blockchain transaction on the respective blockchain network 606*a-c*

FIG. 7 is a block diagram of a computer apparatus 3000 with data processing subsystems or components, according to at least one aspect of the present disclosure. The subsystems shown in FIG. 7 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

FIG. 8 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 4002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multiprocessor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

Clause 1. A method comprising: receiving, by a processor, a user credential and an account identifier from a user interface of a user device; transmitting, by the processor, the user credential to an authentication server; receiving, by the processor, a refresh token based on authentication of the user credential by the authentication server; generating, by the processor, a unique user identifier (UUID) based on the refresh token of the user credential; generating, by the processor, a seed phrase, wherein the seed phrase is randomly generated by a pseudorandom number generator, and wherein the seed phrase is at least n number of bits; determining, by the processor, a master private key, wherein the master private key is derived from the seed phrase, and wherein a first blockchain private key is associated with the master private key; converting, by the processor, the seed phrase to a string seed phrase based on a predetermined word list, a number of words in the string seed phrase is proportional to the at least n number of bits; encrypting, by the processor, the string seed phrase with the UUID, wherein the UUID is an encryption key to generate an encrypted string seed phrase from the string seed phrase; transmitting, by the processor, the encrypted string seed phrase and the account identifier to an external storage location, wherein the external storage location stores the encrypted string seed phrase and the account identifier associated with the user; and deleting, by the processor, the UUID from local cache.

Clause 2. The method of Clause 1, further comprising: receiving, by the processor, a request to perform a first blockchain transaction; determining, by the processor, the UUID based on the refresh token of the user credential, and the account identifier; transmitting, by the processor, a request for the encrypted string seed phrase to the external storage location, wherein the request comprises the account identifier; receiving, by the processor, the encrypted string seed phrase; establishing, by the processor, a blockchain session; storing, by the processor, the encrypted string seed phrase in local storage of the user device; decrypting, by the processor, the encrypted string seed phrase with the UUID as a decryption key, and results in the string seed phrase; recovering, by the processor, the first blockchain private key on a blockchain with the string seed phrase; and signing, by the processor, the first blockchain transaction on the blockchain with the first blockchain private key.

Clause 3. The method of Clause 2, further comprising: determining, by the processor, a status of the blockchain session, wherein the status of the blockchain session is terminated; and deleting, by the processor, the encrypted string seed phrase from the local storage on the user device.

Clause 4. The method of Clause 3, wherein the blockchain session is terminated by closing the user interface, displaying a lock screen on the user device, or an expiration of a predetermined timeout period associated with the blockchain session.

Clause 5. The method of Clauses 2-4, wherein recovering the first blockchain private key is further comprising: requesting, by the processor, the first blockchain private key with the string seed phrase from a hierarchical deterministic wallet associated with the blockchain; and receiving, by the processor, the first blockchain private key from the hierarchical deterministic wallet.

Clause 6. The method of Clauses 1-5, wherein the seed phrase is at least 128 bits and the string seed phrase is at least 12 words.

Clause 7. The method of Clauses 1-6, wherein the seed phrase is at least 256 bits and the string seed phrase is at least 24 words.

Clause 8. The method of Clauses 1-7, further comprising: restricting, by the processor, the UUID to local transmissions within a software development kit within on the user device, wherein the UUID is prevented from transmission to external devices.

Clause 9. A system comprising: account authentication server; crypto platform server; a user device comprising one or more processors, wherein the user device is communicably coupled to the account authentication server and the crypto platform server, and wherein the user device is configure to: receive a user credential and an account identifier from a user interface of user device; transmit the user credential to an authentication server; receive a refresh token based on authentication of the user credential by the authentication server; generate a unique user identifier (UUID) based on the refresh token of the user credential;

generate a seed phrase, a seed phrase, wherein the seed phrase is randomly generated by a pseudorandom number generator, and wherein the seed phrase is at least 128 number of bits; determine a master private key, wherein the master private key is derived from the seed phrase, and wherein a first blockchain private key is associated with the master private key; convert the seed phrase to a string seed phrase based on a predetermined word list, wherein the string seed phrase is at least 12 words; encrypt the string seed phrase with the UUID, wherein the UUID is an encryption key to generate an encrypted string seed phrase from the string seed phrase; transmit the encrypted string seed phrase and the account identifier to an external storage location, wherein the external storage location stores the encrypted string seed phrase and the account identifier associated with the user; and delete the UUID from local cache.

Clause 10. The system of Clause 9, wherein the user device is further configured to: receive a request to perform a first blockchain transaction; determine the UUID based on the refresh token of the user credential, and the account identifier; transmit a request for the encrypted string seed phrase to the external storage location, wherein the request comprises the account identifier; receive the encrypted string seed phrase; establish a blockchain session; store the encrypted string seed phrase in local storage of the user device; decrypt the encrypted string seed phrase with the UUID as a decryption key, and results in the string seed phrase; request the first blockchain private key with the string seed phrase from a hierarchical deterministic wallet associated with a blockchain; recover the first blockchain private key from the hierarchical deterministic wallet; and sign the first blockchain transaction on the blockchain with the first blockchain private key.

Clause 11. The system of Clause 10, wherein the user device is further configured to: determine a status of the blockchain session, wherein the status of the blockchain session is terminated; and delete the encrypted string seed phrase from local storage on the user device.

Clause 12. The system of Clause 11, wherein the blockchain session is terminated by closing the user interface, displaying a lock screen on the user device, or an expiration of a predetermined timeout period associated with the blockchain session.

Clause 13. The system of Clauses 10-12, wherein the user device is further configured to: receives a request to perform a second blockchain transaction, wherein the second blockchain transaction is performed in the blockchain session, and wherein blockchain session is still active from the first blockchain transaction; decrypt the encrypted string seed phrase with the UUID as the decryption key, and results in the string seed phrase; request the first blockchain private key with the string seed phrase from the hierarchical deterministic wallet associated with the blockchain; recover the first blockchain private key from the hierarchical deterministic wallet; sign the first blockchain transaction on the blockchain with the first blockchain private key; and delete the first blockchain private key after the second blockchain transaction is signed.

Clause 14. The system of Clause 13, wherein a value of the first blockchain private key recovered from the hierarchical deterministic wallet for the first blockchain transaction is different from the value of the first blockchain private key for the second blockchain transaction recovered from the hierarchical deterministic wallet.

Clause 15. The system of Clauses 9-14, wherein the user device is further configured to: restrict the UUID to local transmissions within a software development kit within on the user device, wherein the UUID is prevented from transmission to external devices.

Clause 16. A non-transitory computer readable medium, with instructions stored thereon, when executed by one or more processors, cause the one or more processors to perform operations comprising: receiving a user credential and an account identifier from a user interface of a user device; transmitting the user credential to an authentication server; receiving a refresh token based on authentication of the user credential by the authentication server; generating a unique user identifier (UUID) based on the refresh token of the user credential; generating, by the processor, a seed phrase, a seed phrase, wherein the seed phrase is randomly generated by a pseudorandom number generator, and wherein the seed phrase is at least n number of bits; determining a master private key, wherein the master private key is derived from the seed phrase, and wherein a first blockchain private key is associated with the master private key; converting the seed phrase to a string seed phrase based on a predetermined word list, a number of words in the string seed phrase is proportional to the at least n number of bits; encrypting the string seed phrase with the UUID, wherein the UUID is an encryption key to generate an encrypted string seed phrase from the string seed phrase; transmitting the encrypted string seed phrase and the account identifier to an external storage location, wherein the external storage location stores the encrypted string seed phrase and the account identifier associated with the user; and deleting, by the processor, the UUID from local cache.

Clause 17. The non-transitory computer readable medium of Clause 16, when executed by one or more processors is further configured to perform operations comprising: receiving a request to perform a first blockchain transaction on a first blockchain; determining the UUID based on the refresh token of the user credential, and the account identifier; transmitting a request for the encrypted string seed phrase to the external storage location, wherein the request comprises the account identifier; receiving the encrypted string seed phrase; establishing a blockchain session; storing the encrypted string seed phrase in local storage of the user device; decrypting the encrypted string seed phrase with the UUID as a decryption key, and results in the string seed phrase; recovering the first blockchain private key on the first blockchain with the string seed phrase; signing the first blockchain transaction on the first blockchain with the first blockchain private key; and deleting the first blockchain private key after the first blockchain transaction is signed.

Clause 18. The non-transitory computer readable medium of Clause 17, when executed by one or more processors is further configured to perform operations comprising: determining a status of the blockchain session, wherein the status of the blockchain session is terminated; and deleting the encrypted string seed phrase from local storage on the user device.

Clause 19. The non-transitory computer readable medium of Clause 18, wherein the blockchain session is terminated by closing the user interface, displaying a lock screen on the user device, or an expiration of a predetermined timeout period associated with the blockchain session.

Clause 20. The non-transitory computer readable medium of Clauses 17-19, when executed by one or more processors is further configured to perform operations comprising: recovering the first blockchain private key by requesting the first blockchain private key from a hierarchical deterministic wallet with the string seed phrase, wherein the hierarchical deterministic wallet is associated with at least the first blockchain and a second blockchain; and requesting a second blockchain private key with the string seed phrase from the hierarchical deterministic wallet associated with the second blockchain, wherein the second blockchain private key is associated with the master private key, and wherein the first blockchain is different from the second blockchain.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to,"

"configurable to," "operable/operative to," "adapted/ adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method comprising:

receiving, by a processor, a user credential and an account identifier from a user interface of a user device; transmitting, by the processor, the user credential to an authentication server;

receiving, by the processor, a refresh token based on authentication of the user credential by the authentication server;

generating, by the processor, a unique user identifier (UUID) based on the refresh token of the user credential;

generating, by the processor, a seed phrase, wherein the seed phrase is randomly generated by a pseudorandom number generator, and wherein the seed phrase is at least number of bits;

determining, by the processor, a master private key, wherein the master private key is derived from the seed phrase, and wherein a first blockchain private key is associated with the master private key;

converting, by the processor, the seed phrase to a string seed phrase based on a predetermined word list, a number of words in the string seed phrase is proportional to the at least n number of bits;

encrypting, by the processor, the string seed phrase with the UUID, wherein the UUID is an encryption key to generate an encrypted string seed phrase from the string seed phrase;

transmitting, by the processor, the encrypted string seed phrase and the account identifier to an external storage location, wherein the external storage location stores the encrypted string seed phrase and the account identifier associated with the user;

deleting, by the processor, the UUID from local cache; and restricting, by the processor, the UUID to local transmissions within a software development kit within on the user device, wherein the UUID is prevented from transmission to external devices.

2. The method of claim 1, further comprising:

receiving, by the processor, a request to perform a first blockchain transaction;

determining, by the processor, the UUID based on the refresh token of the user credential, and the account identifier;

transmitting, by the processor, a request for the encrypted string seed phrase to the external storage location, wherein the request comprises the account identifier;

receiving, by the processor, the encrypted string seed phrase;

establishing, by the processor, a blockchain session;

storing, by the processor, the encrypted string seed phrase in local storage of the user device;

decrypting, by the processor, the encrypted string seed phrase with the UUID as a decryption key, and results in the string seed phrase;

recovering, by the processor, the first blockchain private key on a blockchain with the string seed phrase; and signing, by the processor, the first blockchain transaction on the blockchain with the first blockchain private key.

3. The method of claim 2, further comprising:

determining, by the processor, a status of the blockchain session, wherein the status of the blockchain session is terminated; and deleting, by the processor, the encrypted string seed phrase from the local storage on the user device.

4. The method of claim 3, wherein the blockchain session is terminated by closing the user interface, displaying a lock screen on the user device, or an expiration of a predetermined timeout period associated with the blockchain session.

5. The method of claim 2, wherein recovering the first blockchain private key is further comprising:

requesting, by the processor, the first blockchain private key with the string seed phrase from a hierarchical deterministic wallet associated with the blockchain; and receiving, by the processor, the first blockchain private key from the hierarchical deterministic wallet.

6. The method of claim 1, wherein the seed phrase is at least 128 bits and the string seed phrase is at least 12 words.

7. The method of claim 1, wherein the seed phrase is at least 256 bits and the string seed phrase is at least 24 words.

8. A system comprising:

account authentication server;

crypto platform server; and a user device comprising one or more processors, wherein the user device is communicably coupled to the account authentication server and the crypto platform server, and wherein the user device is configured to:

receive a user credential and an account identifier from a user interface of user device;

transmit the user credential to an authentication server;

receive a refresh token based on authentication of the user credential by the authentication server;

generate a unique user identifier (UUID) based on the refresh token of the user credential;

generate a seed phrase, a seed phrase, wherein the seed phrase is randomly generated by a pseudorandom number generator, and wherein the seed phrase is at least 128 number of bits;

determine a master private key, wherein the master private key is derived from the seed phrase, and wherein a first blockchain private key is associated with the master private key;

convert the seed phrase to a string seed phrase based on a predetermined word list, wherein the string seed phrase is at least 12 words;

encrypt the string seed phrase with the UUID, wherein the UUID is an encryption key to generate an encrypted string seed phrase from the string seed phrase;

transmit the encrypted string seed phrase and the account identifier to an external storage location, wherein the external storage location stores the encrypted string seed phrase and the account identifier associated with the user;

delete the UUID from local cache; and restrict the UUID to local transmissions within a software development kit on the user device, wherein the UUID is prevented from transmission to external device.

9. The system of claim 8, wherein the user device is further configured to:

receive a request to perform a first blockchain transaction;

determine the UUID based on the refresh token of the user credential, and the account identifier;

transmit a request for the encrypted string seed phrase to the external storage location, wherein the request comprises the account identifier;

receive the encrypted string seed phrase;

establish a blockchain session;

store the encrypted string seed phrase in local storage of the user device;

decrypt the encrypted string seed phrase with the UUID as a decryption key, and results in the string seed phrase;

request the first blockchain private key with the string seed phrase from a hierarchical deterministic wallet associated with a blockchain;

recover the first blockchain private key from the hierarchical deterministic wallet; and sign the first blockchain transaction on the blockchain with the first blockchain private key.

10. The system of claim 9, wherein the user device is further configured to:

determine a status of the blockchain session, wherein the status of the blockchain session is terminated; and delete the encrypted string seed phrase from local storage on the user device.

11. The system of claim 10, wherein the blockchain session is terminated by closing the user interface, displaying a lock screen on the user device, or an expiration of a predetermined timeout period associated with the blockchain session.

12. The system of claim 9, wherein the user device is further configured to:

receives a request to perform a second blockchain transaction, wherein the second blockchain transaction is performed in the blockchain session, and wherein blockchain session is still active from the first blockchain transaction;

decrypt the encrypted string seed phrase with the UUID as the decryption key, and results in the string seed phrase;

request the first blockchain private key with the string seed phrase from the hierarchical deterministic wallet associated with the blockchain;

recover the first blockchain private key from the hierarchical deterministic wallet;

sign the first blockchain transaction on the blockchain with the first blockchain private key; and delete the first blockchain private key after the second blockchain transaction is signed.

13. The system of claim 12, wherein a value of the first blockchain private key recovered from the hierarchical deterministic wallet for the first blockchain transaction is different from the value of the first blockchain private key for the second blockchain transaction recovered from the hierarchical deterministic wallet.

14. A non-transitory computer readable medium, with instructions stored thereon, when executed by one or more processors, cause the one or more processors to perform operations comprising:

receiving a user credential and an account identifier from a user interface of a user device;

transmitting the user credential to an authentication server;

receiving a refresh token based on authentication of the user credential by the authentication server;

generating a unique user identifier (UUID) based on the refresh token of the user credential;

generating, by the processor, a seed phrase, a seed phrase, wherein the seed phrase is randomly generated by a pseudorandom number generator, and wherein the seed phrase is at least n number of bits;

determining a master private key, wherein the master private key is derived from the seed phrase, and wherein a first blockchain private key is associated with the master private key;

converting the seed phrase to a string seed phrase based on a predetermined word list, a number of words in the string seed phrase is proportional to the at least n number of bits;

encrypting the string seed phrase with the UUID, wherein the UUID is an encryption key to generate an encrypted string seed phrase from the string seed phrase;

transmitting the encrypted string seed phrase and the account identifier to an external storage location, wherein the external storage location stores the encrypted string seed phrase and the account identifier associated with the user;

deleting, by the processor, the UUID from local cache; and restricting, by the processor, the UUID to local transmissions within a software development kit on the user device, wherein the UUID is prevented from transmission to external devices.

15. The non-transitory computer readable medium of claim 14, when executed by one or more processors is further configured to perform operations comprising:

receiving a request to perform a first blockchain transaction on a first blockchain;

determining the UUID based on the refresh token of the user credential, and the account identifier;

transmitting a request for the encrypted string seed phrase to the external storage location, wherein the request comprises the account identifier;

receiving the encrypted string seed phrase;

establishing a blockchain session;

storing the encrypted string seed phrase in local storage of the user device;

decrypting the encrypted string seed phrase with the UUID as a decryption key, and results in the string seed phrase;

recovering the first blockchain private key on the first blockchain with the string seed phrase;

signing the first blockchain transaction on the first blockchain with the first blockchain private key; and deleting the first blockchain private key after the first blockchain transaction is signed.

16. The non-transitory computer readable medium of claim 15, when executed by one or more processors is further configured to perform operations comprising:

determining a status of the blockchain session, wherein the status of the blockchain session is terminated; and deleting the encrypted string seed phrase from local storage on the user device.

17. The non-transitory computer readable medium of claim 16, wherein the blockchain session is terminated by closing the user interface, displaying a lock screen on the user device, or an expiration of a predetermined timeout period associated with the blockchain session.

18. The non-transitory computer readable medium of claim 15, when executed by one or more processors is further configured to perform operations comprising:

recovering the first blockchain private key by requesting the first blockchain private key from a hierarchical deterministic wallet with the string seed phrase, wherein the hierarchical deterministic wallet is associated with at least the first blockchain and a second blockchain; and requesting a second blockchain private key with the string seed phrase from the hierarchical deterministic wallet associated with the second blockchain, wherein the second blockchain private key is associated with the master private key, and wherein the first blockchain is different from the second blockchain.

* * * * *